United States Patent [19]

Bowman

[11] 4,229,827
[45] Oct. 21, 1980

[54] SINGLE VOLTAGE CONTROLLED OSCILLATOR MODEM

[75] Inventor: George A. Bowman, Vernon Hills, Ill.

[73] Assignee: Honeywell Inc., Minneapolis, Minn.

[21] Appl. No.: 15,674

[22] Filed: Feb. 26, 1979

[51] Int. Cl.³ .................................................. H04B 1/54
[52] U.S. Cl. ............................................ 455/87; 375/8
[58] Field of Search ................... 325/17, 18, 19, 20; 343/175, 179, 181; 179/16 B, 1 GS, 2 DP, 15 BC, 84 VF; 325/36, 40, 59, 139

[56] References Cited

U.S. PATENT DOCUMENTS

| | | | |
|---|---|---|---|
| 3,484,693 | 12/1969 | Fong | 325/30 |
| 3,546,701 | 12/1970 | Kurth | 343/179 |
| 3,546,702 | 12/1970 | Kurth | 343/179 |
| 3,546,703 | 12/1970 | Kurth | 343/179 |
| 3,550,131 | 12/1970 | Kurth | 343/179 |
| 3,550,132 | 12/1970 | Kurth et al. | 343/179 |
| 3,550,133 | 12/1970 | King et al. | 340/172.5 |
| 3,714,375 | 1/1973 | Stover | 325/36 |
| 3,764,913 | 10/1973 | Ochel et al. | 325/30 |
| 3,832,637 | 8/1974 | Alexander et al. | 179/2 DP |
| 3,944,925 | 3/1976 | De Laune | 325/17 |
| 3,961,136 | 6/1976 | Cohen et al. | 178/67 |
| 3,983,484 | 9/1976 | Hodama | 325/30 |
| 4,002,995 | 1/1977 | Reed | 331/1 A |
| 4,027,242 | 5/1977 | Yamanaka | 325/17 |
| 4,035,727 | 7/1977 | Ishii | 325/17 |
| 4,061,973 | 12/1977 | Reimers et al. | 325/17 |

Primary Examiner—Benedict V. Safourek
Attorney, Agent, or Firm—Trevor B. Joike

[57] ABSTRACT

A modem for transmitting data over one frequency and receiving data over another frequency is disclosed having an oscillator for generating a first signal, a voltage controlled oscillator for generating a second signal, a mixer for mixing the first and second signals to provide a mixer output signal having the transmission frequency, an input data switch for modulating the mixer output signal in accordance with input data, a second mixer connected to the voltage controlled oscillator and to the received incoming signal and a receiver for demodulating the received signal data.

20 Claims, 4 Drawing Figures

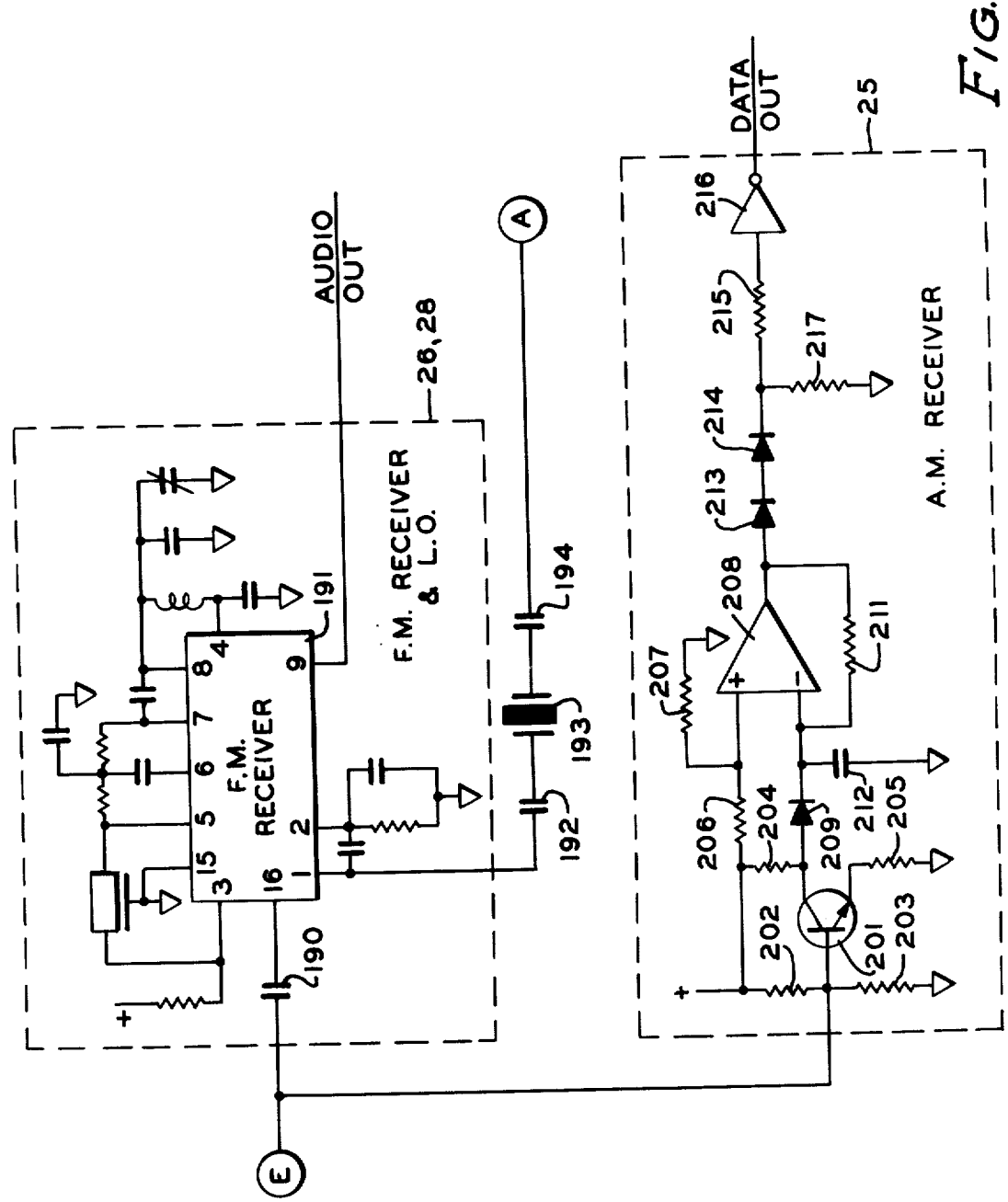

SINGLE VOLTAGE CONTROLLED OSCILLATOR MODEM

BACKGROUND OF THE INVENTION

This invention relates to modems for transmitting and receiving data and, more particularly, to the transmission and reception of data at two different frequencies by using a single voltage controlled oscillator.

It is typical, particularly in transmission systems which have long transmission lines, to use signal boosting sections connected in the transmission line at periodic intervals to amplify the data transmission signal therealong. These signal boost sections typically comprise amplifiers which receive the incoming signal at its input, amplify it and supply the amplified signal to its output. Such amplifiers are unidirectional such that each boost station must have an amplifier for each transmission direction. If separate transmitting and receiving frequencies are not used, cross-talk between the amplifiers in a signal boosting station may interfere with the transmission of data in the other direction. Thus, the typical transmission system will have a head end for receiving a signal at the transmitting frequency and for converting it to a signal at the receiving frequency. Each data station connected to the transmission line will then have a transmitter modem for transmitting data at the transmitting frequency and a receiver modem for receiving data at the receiving frequency.

The prior art modems for this type of application have not been entirely satisfactory for transmitting over plural channels at one frequency and for receiving over the plural channels at a different, second frequency.

SUMMARY OF THE INVENTION

A modem is provided for transmitting data at a transmitting frequency and receiving data at a receiving frequency, where the transmitting frequency and the receiving frequency are different, the modem having an oscillator for generating a first signal, a voltage controlled oscillator for generating a second signal, mixer for mixing the first and second signals to provide a mixer output signal having the transmitting frequency, an input data switch for modulating the mixer output signal in accordance with input data, a second mixer connected to the voltage controlled oscillator and to the received incoming signal and a receiver for demodulating the received signal data.

A further feature of the invention is the provision of a channel selector connected to the voltage controlled oscillator for selecting the channel over which data is transmitted and received.

A still further feature is the provision of a modem over which both digital data and audio signals may be transmitted.

BRIEF DESCRIPTION OF THE DRAWINGS

These and other features and advantages of the invention will become more apparent from a detail consideration of the drawings in which:

FIGS. 2A-2C show the schematic details for the block diagram of FIG. 1.

DETAILED DESCRIPTION

Figure 1:
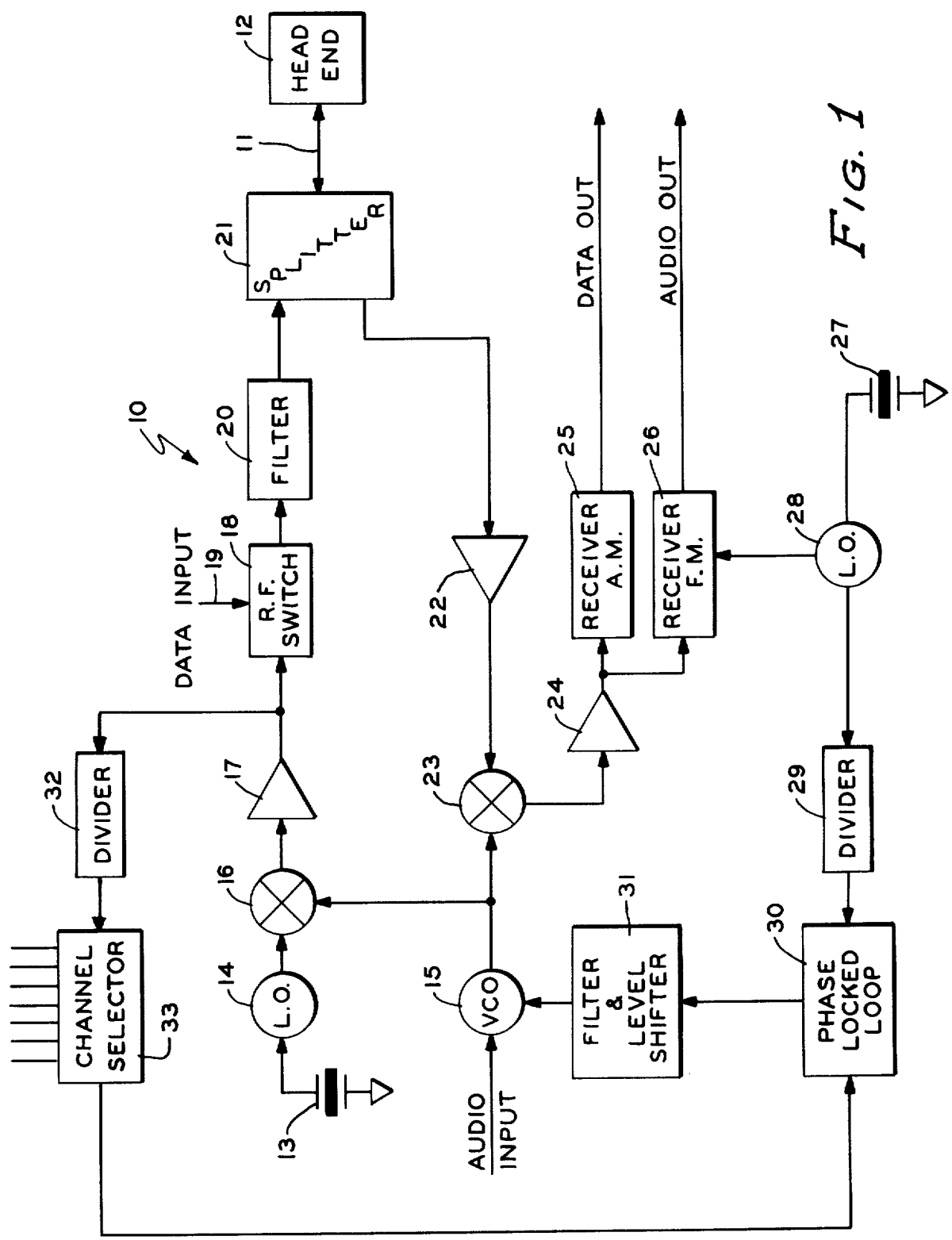
FIG. 1 is a block diagram of the modem according to the instant invention.

The modem 10 of FIG. 1 is connected to a transmission medium which may be a wide band coaxial cable 11 to a head end 12 which receives the signal at the transmitting frequency from modem 10 and converts the signal to the receiving frequency for retransmission over transmission line 11 before it is received by the receiving station. (Although not shown, transmission line 11 may have a plurality of signal boosting stations located in both directions therealong). The transmitting section of modem 10 includes crystal 13 connected to local oscillator 14 for supplying a signal which is mixed with the output signal from voltage controlled oscillator 15 by mixer 16. The output from mixer 16 is the transmitting frequency and is amplified at 17 and supplied to the input of switch 18. Switch 18 is controlled by input 19 to modulate the carrier signal from amplifier 17 by the data to be transmitted. The output from switch 18 is connected through filter 20 and then through splitter 21 to transmission line 11.

The incoming signal from head end 12 supplied over transmission line 11 is connected through splitter 21 to one input of mixer 23 through amplifier 22. The other input of mixer 23 is connected to voltage controlled oscillator 15. The mixed signal is then amplified by amplifier 24 and then connected to the inputs of AM receiver 25 and FM receiver 26. AM receiver 25 demodulates the binary data which has been generated by a switch 18 at another similar modem to its output terminal and supplies it to the data out terminal. Modem 10, in addition to transmitting this binary data, is also capable of transmitting frequency modulated audio signals. The audio input is supplied to voltage controlled oscillator 15 and then connected to the transmission line and is received over the transmission line and demodulated by FM receiver 26 for supply to the audio out terminal.

Second crystal 27 is connected to local oscillator 28 for supplying a base frequency to FM receiver 26 and also a reference frequency through divider 29 to phase locked loop 30 having a second input connected from channel selector 33 which has an input connected from the output of amplifier 17 through divider 32. The output from phase locked loop 30 is connected through a filter and level shifter 31 to the voltage control terminal of voltage controlled oscillator 15. Voltage controlled oscillator 15 in combination with the filter and level shifter 31, phase locked loop 30 and channel selector 33 establish the channel over which data is to be transmitted and received.

Once this channel is selected, the output from voltage controlled oscillator 15 is mixed by mixer 16 with the local oscillator 14 output and modulated by switch 18 for transmission over transmission line 11. Head end 12 converts the frequency of the transmitted signal to the receiving frequency for this channel and retransmits the new frequency over line 11 to the receiving station. Modem 10 of the receiving station will then amplify the received signal by amplifier 22, mix the signal having the receiving frequency with the output of voltage controlled oscillator 15 to convert the received signal to the frequency of the AM receiver 25 so that the data can be demodulated and supplied to the data output terminal.

Figure 2A:
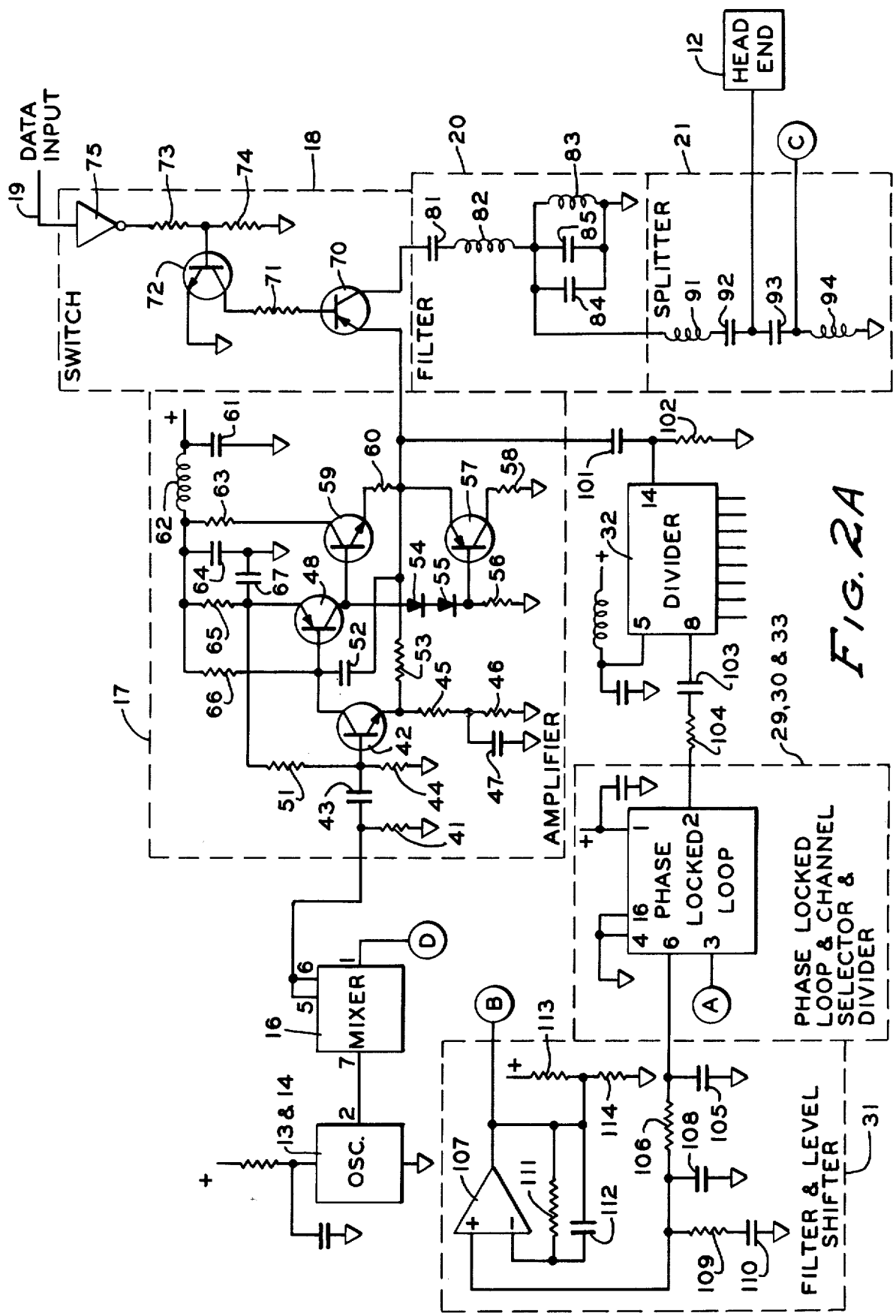
Figure 2B:
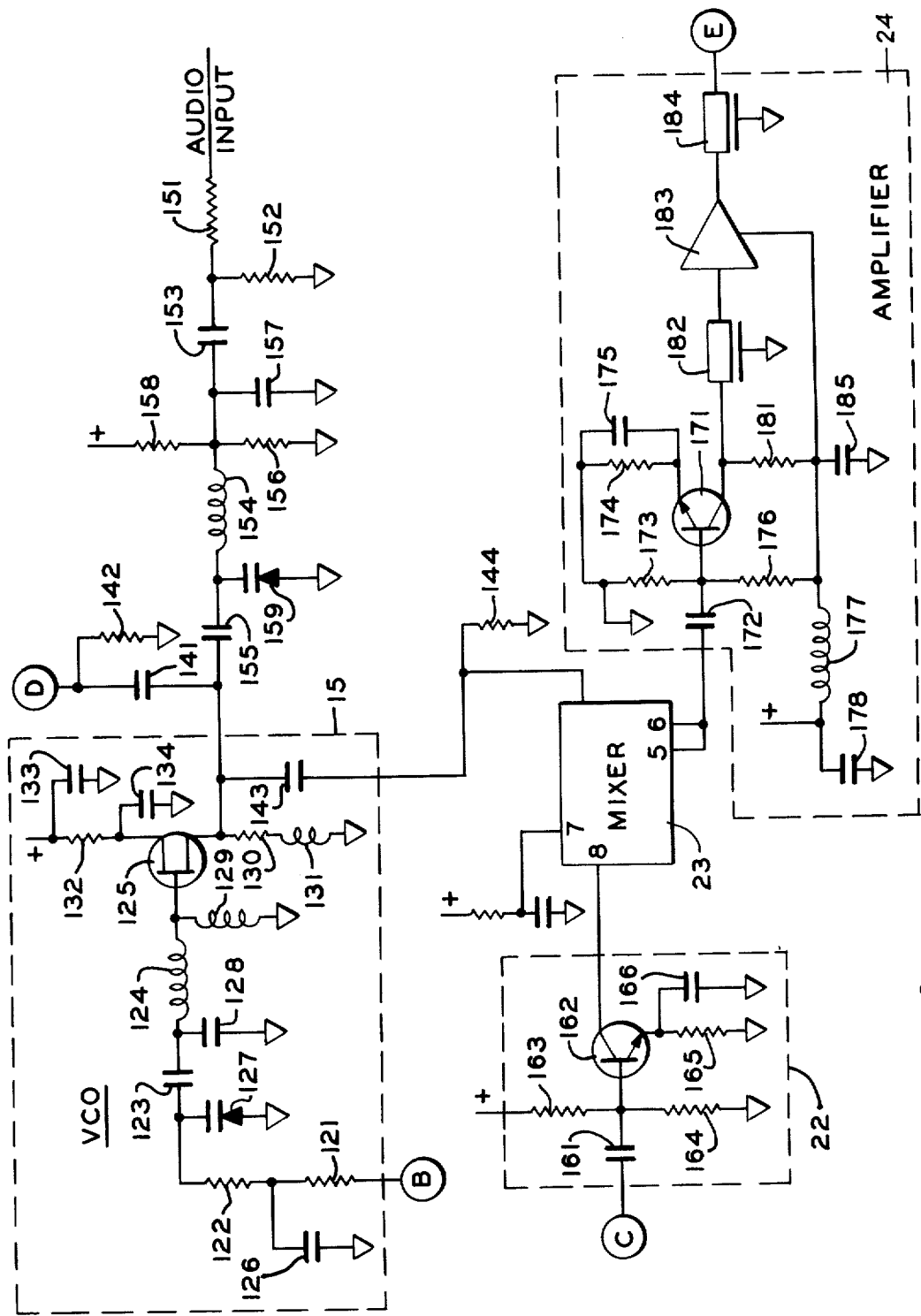

Crystal 13 and oscillator 14 are shown by the single element in FIG. 2A which may be an oscillator having the type number OE-1 supplied by International Crystal Manufacturing Company. The output from this oscillator is connected to the input of mixer 16 which may have standard part number Minicircuits SBL-1. Mixer 16 has a second input connected over Terminal D from the output of voltage controlled oscillator 15 (FIG. 2B). The output from mixer 16 is connected to the input of driver amplifier 17 shown in detail in FIG. 2A.

The output from mixer 16 is connected to ground through resistor 41 and is also connected to the base of transistor 42 through capacitor 43. The junction of capacitor 43 and the base of transistor 42 is connected to ground through resistor 44. The emitter of transistor 42 is connected to ground through series connected resistors 45 and 46 the junction of which is connected to ground through capacitor 47. The collector of transistor 42 is connected to the base of transistor 48. The emitter of transistor 48 is connected back to the base of transistor 42 through resistor 51 whereas the base of transistor 48 and the collector of transistor 42 are connected through capacitor 52 and resistor 53 to the emitter of transistor 42. The collector of transistor 48 is connected to ground through the series circuit of diode 54, diode 55 and resistor 56 with the junction of diode 55 and resistor 56 being connected to the base of transistor 57 the collector of which is connected to ground through resistor 58. The emitter of transistor 58 is connected to the junction of capacitor 52 and resistor 53 and also to the emitter of transistor 59 through resistor 60. The base of transistor 59 is connected to the junction of the collector of transistor 48 and diode 54. A bias source is connected to ground through capacitor 61 and is also connected to the collector of transistor 59 through coil 62 and resistor 63. The junction of coil 62 and resistor 63 is connected to ground through capacitor 64 and is also connected to the emitter of transistor 48 through resistor 65 and to the base of transistor 48 through resistor 66. The emitter of transistor 48 is connected to ground through capacitor 67. The gain of this amplifier is established principally by the ratio of resistor 53 to resistor 45.

The junction of resistor 60 and the emitter of transistor 57 supplies the carrier signal to switch 18 for modulation by the input data. Switch 18 includes transistor 70 which has an emitter connected to the output of amplifier 17 and a base connected through resistor 71 to the collector of transistor 72 the emitter of which is connected to ground. The base of transistor 72 is connected to the junction of series connected resistors 73 and 74 connected between ground and inverter 75 having an input to receive the input data. When a forward bias is applied to the base of transistor 70 via transistor 72, the carrier signal may flow to filter 20.

The collector of transistor 70 represents the output of switch 18 and is connected to filter 20 which includes the series connection of capacitor 81 and coil 82 connected to the parallel combination of coil 83, capacitor 84 and capacitor 85 the other side of which is connected to ground. The junction of the series circuit and the parallel circuit is then connected to splitter 21 in the form of series connected coil 91, capacitor 92, capacitor 93 and coil 94 the other side of which is connected to ground. Such an arrangement is known to provide a band-limited response for the transmitter. The junction of capacitors 92 and 93 is connected to the transmission line to which head end 12 is connected and the junction of capacitor 93 and coil 94 is connected to amplifier 22. This arrangement provides a bandlimited response for the receiver.

The output from amplifier 17 is also connected through the series combination of capacitor 101 and resistor 102 to ground with the junction of capacitor 101 and resistor 102 connected to the input of divider 32 which may be an SN74LS93. The output from divider 32 is connected through the series circuit of capacitor 103 and resistor 104 to the input of phase locked loop, channel selector and divider circuit 29, 30 and 31. This circuit can be supplied under the standard part number Motorola MC145109 and contains the necessary circuitry for the phase locked loop, plural channel selector 31 and divider 29. The phase locked loop circuit also has a further input A from local oscillator 28 as shown in FIG. 2C which includes a fixed divider and has an error voltage output connected to the input of filter and level shifter apparatus 31 whose purpose is to precondition the signal for VCO 15.

This input is connected to ground through capacitor 105 and to the input of amplifier 107 through resistor 106. The junction of this input to amplifier 107 and resistor 106 is connected to ground both through capacitor 108 and through the series combination of resistor 109 and capacitor 110 which is known as the loop filter. The output of level shifter amplifier 107 is connected back to its other input by the parallel combination of resistor 111 and capacitor 112 and is also connected to the junction of the series connected circuit formed by resistors 113 and 114 connected between a positive source and ground. The output from filter and level shifter 31 is connected to terminal B which forms one input to voltage controlled oscillator 15 as shown in FIG. 2B.

Terminal B is connected through a series combination of resistor 121, resistor 122, capacitor 123 and coil 124 to the emitter of field effect transistor oscillator 125 which can be Siliconix J310. The junction of resistors 121 and 122 is connected to ground through capacitor 126, the junction of resistor 122 and capacitor 123 is connected to ground through varactor diode 127, the junction of capacitor 123 and resonant coil 124 is connected to ground through capacitor 128, and the junction of resonant coil 124 and the emitter of field effect transistor oscillator 125 is connected to ground through choke coil 129. The source of field effect transistor oscillator 125 is connected to ground through series connected resistor 130 and choke coil 131 whereas the drain is connected to the positive supply through resistor 132. The junction of the drain and resistor 132 is connected to ground through bypass capacitor 134, and the junction of the positive supply of field effect transistor oscillator 125 and resistor 132 is connected to ground through bypass capacitor 133. The source of field effect transistor oscillator 125 forms the output from voltage controlled oscillator 15 and is connected to input terminal D of mixer 16 shown in FIG. 2A through distribution capacitor 141. The junction of capacitor 141 and terminal D is connected through resistor 142 to ground. This output is also connected through distribution capacitor 143 to one input of the other mixer 23 which also may be a Minicircuits SBL-1 and the junction of capacitor 143 and that input of mixer 23 is connected to ground through resistor 144.

The output from VCO 15 also serves as the audio input line. The audio input is connected to the output of voltage controlled oscillator 15 through the series combination of resistor 151, capacitor 153, choke coil 154 and capacitor 155. The junction of resistor 151 and capacitor 153 is connected to ground through resistor 152, the junction of capacitor 153 and choke coil 154 is connected to the voltage divider comprised of resistor 156 and resistor 158 connected between a positive source and ground. Capacitor 157 connects the midpoint of this divider to ground, and the junction of choke coil 154 and capacitor 155 is connected to ground through varactor diode 159. The purpose of this diode is to FM modulate the carrier.

Output terminal C from splitter 21 is connected to preamplifier 22 before it is mixed with the output from voltage controlled oscillator 15. This preamplifier comprises capacitor 161 connected between terminal C and the base of transistor 162 the junction of which is biased to a positive source through resistor 163 and to ground through resistor 164. The emitter of this transistor is connected to ground through the parallel combination of resistor 165 and capacitor 166. The collector of transistor 162 is connected to the other input of mixer 23 which combines the output from amplifier 22 with the output from the voltage controlled oscillator 15 and which supplies its output to the input of amplifier 24.

This amplifier comprises buffer transistor 171 having a base connected through bypass capacitor 172 to the output of mixer 23. The base of transistor 171 is biased through resistor 173 to ground and the emitter is connected to ground through the parallel combination of resistor 174 and capacitor 175. The base of transistor 171 is connected to a positive source through series connected resistor 176 and choke coil 177. The junction of capacitor 178 and choke 177 is connected to a positive source, and the common junction of resistor 181, resistor 176 and choke coil 177 is connected to bypass capacitor 185 whose opposite terminal is grounded. The collector of transistor 171 is connected to the junction of resistor 176 and coil 177 through resistor 181 and is also connected through ceramic filter 182 to the input of buffer amplifier 183 which may take the same form as the amplifier 17 as shown in FIG. 2A. The output of this amplifier is connected through another ceramic filter 184 to the terminal E which provides an input to the two receivers 25 and 26 shown in FIG. 2C.

Terminal E is connected through capacitor 190 to FM receiver 191 which forms the part of receiver and local oscillator 26,28 and which may be supplied under standard part number MC3357P. This receiver is connected as shown and incorporates an oscillator circuit therein which is connected by pin 1 through capacitor 192 to oscillator crystal 193 the other side of which is connected through capacitor 194 to terminal A which is connected to phase locked loop, channel selector and divider 29, 30,31. The output at pin 9 provides the audio out signal.

Terminal E is also connected to AM receiver 25 which is comprised of transistor 201 having a base connected to terminal E, to a positive source through resistor 202, and to ground through resistor 203. Transistor 201 also has a collector connected through resistor 204 to the positive source and an emitter connected through resistor 205 to ground. The positive source is also connected through series connected resistor 206 and resistor 207 to ground, the junction of which is connected to the positive input of operational amplifier 208 having a negative input connected from the collector of transistor 201 through diode 209. The output of amplifier 208 is connected through feedback resistor 211 to its negative input which is connected to ground through filter capacitor 212. The output from amplifier 209 is also connected through series connected diode 213, diode 214, resistor 215 and inverter 216 for supplying the data output signal. The junction of diode 214 and resistor 215 is connected to ground through resistor 217.

I claim:

1. A modem for transmitting data over a transmitting frequency and receiving data over a receiving frequency, wherein said transmitting frequency and said receiving frequency have different values, said modem comprising:
   a first oscillator for generating a first signal of a first frequency;
   voltage controlled oscillator means having a voltage controlled oscillator for generating a second signal of a second frequency;
   first mixer means connected to said first oscillator and to said voltage controlled oscillator for providing a first mixer output signal having a transmitting third frequency as a combination of said first frequency and said second frequency;
   input data means responsive to input data for modulating said first mixer output signal and for supplying said modulated first mixer output signal to a transmission medium;
   second mixer means connected to said voltage controlled oscillator and said transmission medium for mixing said second signal of said second frequency and said received data having a receiving fourth frequency, wherein said third and fourth frequencies have different values; and,
   receiver means connected to said second mixer means for demodulating said received data.

2. The modem of claim 1 wherein said voltage controlled oscillator means comprises an audio input connected to said voltage controlled oscillator for transmitting an audio modulated signal.

3. The modem of claim 2 wherein said receiver means comprises an AM receiver connected to said second mixer means for supplying said received data to an output data terminal and an FM receiver connected to said second mixer means for supplying an audio output signal to an audio output terminal.

4. The modem of claim 3 wherein said input data means comprises a switch having an input terminal connected to the output of said first mixer means, an output terminal connected through means to said transmission medium, and a control terminal connected to receive said input data.

5. The modem of claim 4 wherein said voltage controlled oscillator means comprises phase locked loop means having an output connected to a second input of said voltage connected oscillator.

6. The modem of claim 5 wherein said phase locked loop means comprises a multichannel selector for selecting the channel over which said data is transmitted and received.

7. The modem of claim 6 wherein said phase locked loop means further comprises a second oscillator and a phase locked loop circuit, said phase locked loop circuit having an output connected to said voltage controlled oscillator, a first input connected to said multichannel selector, and a second input connected to said second oscillator.

8. The modem of claim 7 wherein said second oscillator is also connected to said FM receiver.

9. The modem of claim 1 wherein said receiver means comprises an AM receiver connected to said second mixer means for supplying said received data to an output data terminal.

10. The modem of claim 9 wherein said input data means comprises a switch having an input terminal connected to the output of said first mixer means, an output terminal connected through means to said transmission medium, and a control terminal connected to receive said input data.

11. The modem of claim 10 wherein said voltage controlled oscillator means comprises a phase locked loop means having an output connected to an input of said voltage controlled oscillator.

12. The modem of claim 11 wherein said phase locked loop means comprises a multichannel selector for selecting the channel over which said data is transmitted and received.

13. The modem of claim 12 wherein said phase locked loop means further comprises a second oscillator and a phase locked loop circuit, said phase locked loop circuit having an output connected to said voltage controlled oscillator, a first input connected to said multichannel selector, and a second input connected to said second oscillator.

14. The modem of claim 1 wherein said voltage controlled oscillator means comprises a multichannel selector means connected to said voltage controlled oscillator means for selecting the channel over which said data is transmitted and received.

15. The modem of claim 14 wherein said voltage controlled oscillator means comprises a phase locked loop means having an output connected to an input of said voltage controlled oscillator.

16. The modem of claim 15 wherein said phase locked loop means further comprises a second oscillator and a phase locked loop circuit, said phase locked loop circuit having an output connected to said voltage controlled oscillator, a first input connected to said multichannel selector, and a second input connected to said second oscillator.

17. The modem of claim 1 wherein said input data means comprises a switch having an input terminal connected to the output of said first mixer means, an output terminal connected through means to said transmission medium, and a control terminal connected to receive said input data.

18. The modem of claim 17 where in said voltage controlled oscillator means comprises a phase locked loop means having an output connected to an input of said voltage controlled oscillator.

19. The modem of claim 18 wherein said phase locked loop means comprises a multichannel selector for selecting the channel over which said data is transmitted and received.

20. The modem of claim 19 wherein said phase locked loop means further comprises a second oscillator and a phase locked loop circuit, said phase locked loop circuit having an output connected to said voltage controlled oscillator, a first input connected to said multichannel selector, and a second input connected to said second oscillator.

* * * * *